(12) United States Patent
Hu et al.

(10) Patent No.: US 7,899,451 B2
(45) Date of Patent: Mar. 1, 2011

(54) OWA CONVERGED NETWORK ACCESS ARCHITECTURE AND METHOD

(76) Inventors: Jianhong Hu, Cupertino, CA (US); Willie Wei Lu, Cupertino, CA (US)

( * ) Notice: Subject to any disclaimer, the term of this patent is extended or adjusted under 35 U.S.C. 154(b) by 732 days.

(21) Appl. No.: 11/780,471

(22) Filed: Jul. 20, 2007

(65) Prior Publication Data
US 2009/0023453 A1    Jan. 22, 2009

(51) Int. Cl.
*H04W 4/00* (2009.01)
(52) U.S. Cl. .............. 455/422.1; 455/403; 455/434; 370/469; 370/328; 370/332
(58) Field of Classification Search ............ 455/403, 455/422.1, 452.1; 370/312; 709/223
See application file for complete search history.

(56) References Cited

U.S. PATENT DOCUMENTS

| | | | |
|---|---|---|---|
| 2004/0249915 A1* | 12/2004 | Russell | 709/223 |
| 2005/0130611 A1* | 6/2005 | Lu et al. | 455/130 |
| 2005/0159123 A1* | 7/2005 | Lu | 455/183.2 |
| 2005/0250468 A1* | 11/2005 | Lu et al. | 455/403 |
| 2006/0034335 A1* | 2/2006 | Karaoguz et al. | 370/477 |
| 2009/0168683 A1* | 7/2009 | Franceschini et al. | 370/312 |

* cited by examiner

*Primary Examiner* — Jinsong Hu
*Assistant Examiner* — Nathan Taylor (57) ABSTRACT

As no single wireless network can provide both broadband high-speed radio transmission and seamless full mobility for commercial wireless communications in terms of technology, cost, spectrum and performance, a new wireless converged network access infrastructure based on Open Wireless Architecture (OWA) has been disclosed, wherein the spectrum is separated into low spectrum band (LSB) for wide area seamless mobility networks and high spectrum band (HSB) for very high-speed broadband wireless access systems in order to maximize the spectrum utilization efficiency for the converged multiple wireless access networks of the fully service-oriented wireless communications including multimedia broadcast and multicast service.

3 Claims, 5 Drawing Sheets

OWA Access Network Architecture

FIG.1 OWA Multicast Broadcast Network Architecture

FIG.2 OWA LSB/HSB Convergence Architecture

FIG.3 OWA Access Network Architecture

FIG.4 OWA-CAP MAC Layer Architecture

FIG.5 TDD-OWA MAC Slot Structure in Uplink and Downlink

OWA CONVERGED NETWORK ACCESS ARCHITECTURE AND METHOD

FIELD OF THE DISCLOSURE

The present disclosure relates generally to wireless communications, and more particularly to the future converged wireless and mobile communications based on Open Wireless Architecture (OWA) convergence technology where different multiple wireless access networks of both wide area seamless mobile networks and broadband high-speed wireless access systems construct the cost-effective and spectrum-efficient common wireless access platform in delivering the future service-oriented wireless communications including the multimedia broadcast and multicast service.

BACKGROUND OF THE DISCLOSURE

The third-generation (3G) mobile communication systems are starting in commercial services worldwide. Though 3G wireless systems can offer higher transmission rate and support certain multimedia services, it has many problems in the closed network architecture, quality-of-service (QoS) guarantee, closed air interface architecture and limited data rates for future multimedia services due to the continuous increase of subscribers and traffics.

Traditionally, all mobile communication services are based on specific wireless radio transmission technologies (RTT) or air interfaces such as GSM (global service for mobile communication) and CDMA (code division multiplexing access) networks. With more and more applications and services are developed for wireless mobile communications, the conventional radio access network architecture based on closed and specific RTTs are not suitable for such future service delivering platform.

The future wireless and mobile communication services require both broadband multimedia transmission in a more spectrum-efficient fashion, and the conventional voice and data services in a more cost-effective fashion. In addition, the wireless broadcast and multicast services for the mobile terminal users are becoming very important and how to improve the transmission performance for such broadcast and multicast services is very critical in terms of spectrum utilization efficiency and QoS requirements.

The main considerations of the future commercial mobile and wireless communication networks should comprise:
1. High spectrum utilization efficiency and dynamic spectrum access capability because the wireless spectrum is a very limited natural resource, and becomes much more and more expensive in the future,
2. Broadband high-speed transmission capability to support the wireless multimedia services,
3. Seamless mobility capability to have users access the information from anywhere, anytime and anyone,
4. Asymmetric and adaptive transmission capability in both uplink and downlink channels to support open service architecture of mobile communications,
5. Cost effective system platform for the commercial applications which means the business model and value chain are targeted for profits as the first consideration, Technically, no single wireless RTT or air interface can meet all the above five requirements for the future commercial mobile and wireless communications.

Therefore, the future commercial wireless and mobile communications must be based on a new architecture to converge multiple RTTs or air interfaces onto one common broadband wireless system platform which is technically called "Open Wireless Architecture (OWA)".

Similar to the personal computer system with Open Computer Architecture (OCA), OWA defines an open convergence platform so that different RTTs, such as OFDMA (orthogonal frequency division multiplexing access), CDMA and TDMA (time division multiplexing access), can work together as a whole to compliment each other in any optimal way to deliver the service-oriented transmission platform, rather than the standard-specific platform. Based on OWA architecture, two or three selected RTTs can fully meet all the five requirements for the future commercial mobile wireless communications.

Based on the OWA convergence platform, different multiple radio access networks can work together and operate as a common system platform in providing the converged networks and services delivering infrastructure, to be integrated with the backbone IP core networks to realize the total convergence across the multi-layered information delivery architecture.

With the OWA convergence framework, the very high-speed broadband wireless transmissions (date rate around 100 Mbps and above) are limited to the high spectrum band above 3 GHz, and the seamless mobile transmission and wide area radio transmission are limited to the low spectrum band of 3 GHz and below. The converged OWA system can support the future mobile and wireless communication services of variable data rates from hundreds of Kbps to hundreds of Mbps in one radio system, by supporting open air interfaces including CDMA, TDMA and OFDMA for the common access networks.

OWA systems are totally different from those of traditional wireless radio communication architecture including software definable radio (SDR) in that the OWA system modules, such as service layer, network layer, link layer, access control layer and physical layer, are extensible, upgradeable, variable and removable for the optimized convergence of access networks and service delivery. OWA wireless platform is optimized for the seamless convergence by mapping various wireless air interfaces (RTTs) into open interface parameters defined by the OWA BIOS (basic input/output system) and Framework architecture.

In addition to the open air interfaces of future wireless transmission, there is an ever-increasing desire to access various types of multimedia content by a ubiquitous and open access network, and the future fourth generation (4G) mobile system will become the backbone of multimedia communications. Traditionally, services and networks are tightly coupled, because different networks have different characteristics and capabilities, and different services can only be supported via specific network. For example, voice in telecommunication networks, and TV in broadcast cable networks. Now, both services and networks are evolving to be more efficient to support IP (Internet Protocol) technology, and this will bring the convergence of services on different networks, and bring the network convergence in the end. So we can say the converged network can be defined as a network with harmonic co-existence between unicast service, broadcast/multicast service and quality service continuity of multiple traffics. Unified service delivery platform (SDP) is necessary to simplify the maintenance and operation, and reduces the expenditure of the operators which is very important for commercial mobile communications.

SUMMARY OF THE INVENTION

An object of the invention is to overcome at least some of the drawbacks relating to the compromise designs of prior art systems as discussed above.

The 4G wireless and mobile system has been envisaged as an evolution and convergence of mobile cellular systems, broadband wireless access systems, and IP (Internet Protocol) technologies to offer a multitude of services over a variety of radio transmission technologies (RTT). Based on the requirements of future mobile communication, it is envisaged that 4G networks will support:

1. Open access network architecture. Coexistence and convergence of different access networks, including ad hoc networks and mesh networks, are anticipated. Furthermore, this open architecture enables application service provider and application content provider to offer services and contents independent from network operations.
2. Controlled service access by users and devices anywhere and anytime by different means.
3. Pervasive and seamless mobile multiparty multimedia communications and access to all kinds of services to minimize adverse impact on user experience in the changing networking environments.
4. Value-added interface to upper-layer applications to enable and enhance their location, context, and QoS awareness.
5. Interactions among heterogeneous access systems for optimal mobility management and better utilization of scarce radio resources.
6. Specific radio transmission technology (RTT) invisible to end-users to deliver the truly service-oriented platform rather than the traditional RTT-specific platform.

The desire to seamlessly deliver application services across heterogeneous and open access networks in 4G wireless system leads to an obvious conclusion that 4G systems would best be built on IP networking technologies with Open Wireless Architecture (OWA) wireless convergence platform.

Therefore, the OWA Converged Network Access Architecture of the present invention comprises the following elements:

1. Convergence of networks and services. The future 4G mobile communications will support varied applications and services in one single system platform based on OWA common system architecture.
2. Convergence of different RTTs in one common mobile terminal (MT) and common access point (CAP) platforms. The traditional base-station concept and architecture will be replaced with the CAP system for the truly convergence of various open air interfaces.
3. Separation of high spectrum and low spectrum bands for both broadband and seamless mobility consideration. This enables the future open spectrum management for the OWA wireless convergence platform because no single RTT can provide both broadband and seamless capabilities. By limiting the seamless mobility and wide range coverage within the low spectrum bands, and the broadband high-speed hotspot coverage and low mobility within the high spectrum bands can maximize the spectrum utilization efficiency and optimize the wireless convergence performance. The default broadband and high-speed threshold is set to 100 Mbps, and the cutoff point of low and high spectrum bands is set to 3 GHz. However, these reference points can be altered and adjusted based on the OWA framework platform.
4. Optimization of multiple network access architecture and access performance. Reducing the network access nodes and the transmission delay becomes the critical issue in the converged access platforms. Furthermore, how to improve the converged medium access control (MAC) performance and manage the radio resources wisely are also very important for the 4G network infrastructure.
5. Optimization of broadcast and multicast service delivery architecture for the converged multiple access networks. The multimedia broadcast and multicast service (MBMS) offerings are important 4G services to drive this technology to be a successful commercial business model. The improvement of MBMS transmission performance and delivery mechanism can optimize the wireless spectrum utilization efficiency.
6. TDD (time division duplex) OWA convergence platform. TDD is a very good duplex solution for the 4G wireless and mobile communications because TDD does not need two separate spectrum bands for transmitting and receiving which helps the future open spectrum management and dynamic spectrum allocation. Furthermore, TDD supports asymmetric traffics in downlink and uplink channels which are very important for the MSMS and Internet services. In addition, TDD is optimized for multiple cooperative radio resources management because TDD slots can be adaptively managed by software and TDD-OWA MAC frame are open architecture which can be easily reconfigured and extended.

The details of the present invention are disclosed in the following drawings, descriptions as well as the claims based on the abovementioned elements.

The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

Having thus described the invention in general terms, reference will now be made to the accompanying drawings, which are not necessarily drawn to scale, and wherein:

Like reference numerals refer to like parts throughout the several views of the drawings.

DESCRIPTION OF THE PREFERRED EMBODIMENT

The present inventions now will be described more fully hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

Figure 1:
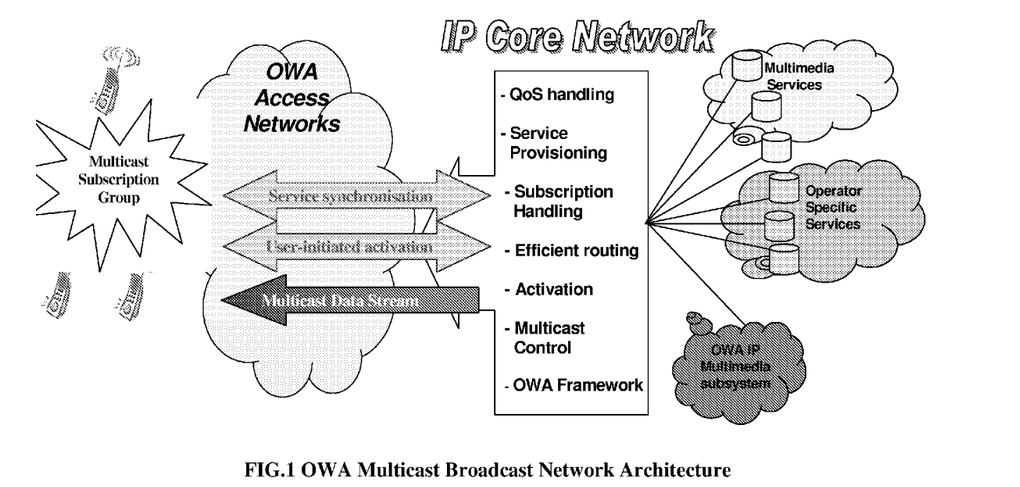
FIG. 1 illustrates the OWA multicast and broadcast network architecture supporting multimedia broadcast and multicast services throughout the OWA access networks.

In the future mobile communications, the multicast and broadcast traffics including text, audio download and mobile TV can be available in locations where the consumers might expect to receive them, and can be received on mobile handheld devices with formats similar to existing portable DVD or MP3/Video players. To efficiently deliver the commonly demanded multimedia content to multiple subscribers of various different air interfaces at the same time, the OWA based MBMS (Multimedia Broadcast/Multicast Service) mechanism is proposed, and the OWA multicast broadcast network architecture is shown in FIG. 1. The MBMS is a unidirectional point to multipoint bearer service in which data is transmitted from a single source entity to multiple recipients. MBMS also enables an OWA IP multimedia application located on an application server to send multimedia to a set of IP multimedia users in the service area through MBMS bearer service. The IP core network (CN) units will send data one-time to OWA Access Network (AN) regardless of the number of Node Bs and mobile equipments that wish to receive it. The benefit of multicast and broadcast on the air interface is that many users can receive the same data on a common channel, thus not clogging up the air interface with multiple transmissions of the same data, especially in the converged multiple air interfaces environment.

There are two operation modes for MBMS: the broadcast mode and multicast mode. An example of a service using the broadcast mode could be advertising or a welcome message to the network. As not all the users accessed to the network may wish to receive these messages then the user shall be able to enable/disable the reception of these broadcast services on his mobile terminal (MT). The broadcast mode differs from the multicast mode in that there is no specific requirement to activate or subscribe to the MBMS, while the multicast mode allows the unidirectional point-to-multipoint transmission of multimedia data (e.g. text, audio, picture, video) from a single source point to a multicast group in a multicast service area, and multicast services can only be received by such users that are subscribed to the specific multicast service and have joined the multicast group associated with the specific service which is shown in FIG. 1. Data is transmitted in the multicast service area as defined by the home network (home environment) and in the multicast mode there is the capability for the network to selectively transmit to cells within the multicast service area which contain members of a multicast group.

MBMS data transmission can adapt to different AN's capabilities or different radio resource availability based on OWA infrastructure. For the OWA radio access network (RAN) of open air interfaces and IP core network to support unicast and multicast services optimally, there are many issues including:
1. IP-based network architecture and protocols design,
2. Acceptable QoS requirement over network,
3. Signaling interface between MTs, AN and CN,
4. Soft and hard handover in multicasting over AN,
5. Determination of the content to be delivered.

Figure 2:
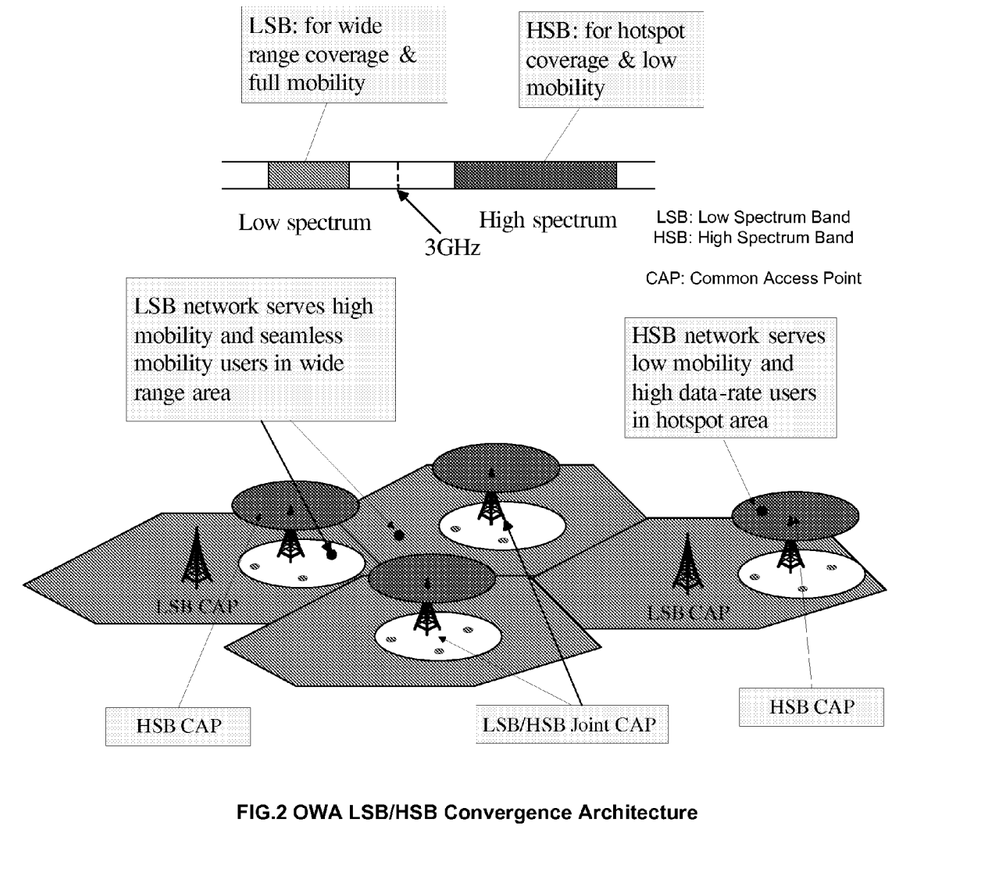
FIG. 2 shows the OWA LSB and HSB convergence architecture to optimize the spectrum utilization by separating the low spectrum band for wide range coverage and full seamless mobility, with the high spectrum band for hotspot coverage and low mobility.

Therefore, the OWA multicast and broadcast network includes the following open processing modules:
1. QoS handling
2. Service Provisioning
3. Service Synchronization
4. Subscription Handling
5. Efficient Routing
6. Activation including user-initiated activation
7. Multicast control for multicast data stream
8. OWA framework platform The system requirement of 4G (fourth generation) mobile communications is targeted up to 100 Mbps for high mobility, wide range coverage and 1 Gbps for low mobility isolated (hotspot) coverage. To achieve the 100 Mbps peak data rate for high mobility, one solution is to deploy an ultra broadband system in new spectrum. Spectrum accommodating higher channel bandwidth (>40 MHz) can be found in a higher frequency spectrum band, e.g. 3.4~6.0 GHz. However, the spectrum may not be suitable to provide wide range coverage and support high mobility due to propagation model and fading model when the frequency is too high. The projected system performance may be reached by consuming higher bandwidth, e.g. up to 100 MHz. However, this may significantly reduce the spectral efficiency and result in an uneconomical use of spectrum. Hence we need to explore new solutions in legacy spectrum which are identified for IMT-2000 (third generation) systems and located below 3 GHz. This below-3 GHz spectrum band is suitable to provide wide range coverage and support high mobility, and we name this system as Low Spectrum Band (LSB) system. In order to provide Gbps peak data rate for low mobility hotspot coverage, the ultra broadband transmission can be up to 100 MHz bandwidth per channel, which can be deployed in the new spectrum well above 3 GHz limit. We call this kind of wireless system as High Spectrum Band (HSB) system. So how to aggregate the above two systems and cooperate with other access networks to converge the wireless and mobile communications for the future service-oriented mobility infrastructure become the critical issue in 4G mobile communications. FIG. 2 shows the OWA LSB and HSB architecture for 4G mobile communications.

As shown in FIG. 2, the HSB CAP (common access point) can share the same entity with LSB CAP or be an independent entity based on the commercial network optimizations by the operators. For cost effective consideration, the relay technique can be applied to the HSB/LSB systems, and in the hotspot or the new emerging commercial areas, the LSB CAP can be replaced or extended with relay node to expand the service coverage.

Figure 3:
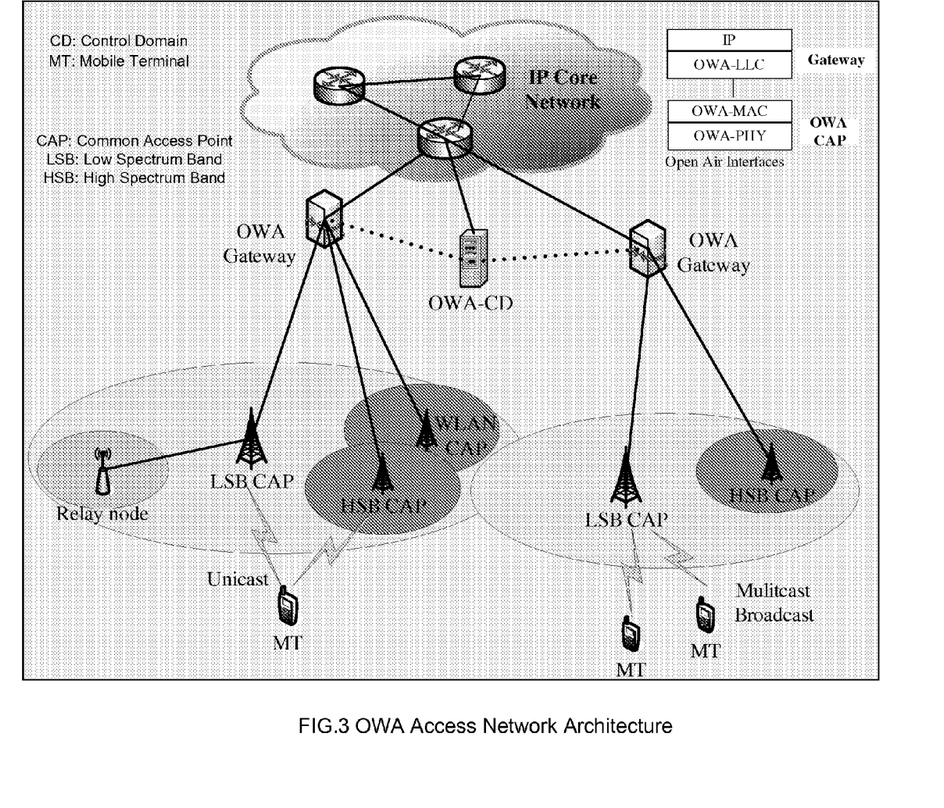
FIG. 3 introduces the OWA access network architecture comprising the major access subsystems: OWA gateway, OWA CAP (common access point) and OWA CD (control domain) for the future service-oriented wireless and mobile communication infrastructure.

Some radio transmission technologies (RTTs) or called Air Interfaces, have been developed or being developed for the legacy spectrum, e.g. WCDMA (wideband code division multiplexing access), TD-SCDMA (time division-synchronized CDMA), CDMA2000 and so on. Convergence between these existing mobile networks and the other broadband wireless networks will definitely bring more values to the operators, providers and end-users because the future wireless and mobile communications will be based on the service-oriented rather than standards-specific platform. FIG. 3 illustrates the OWA access network architecture for the 4G mobile communications. It is important that reducing the number of network nodes along the data path to decrease the interface delay, access delay and providing seamless handover in heterogeneous network is a vital issue for the 4G mobile communication infrastructure.

In the OWA network layer, the wireless access systems comprise three parts: OWA Gateway, OWA Control Domain (CD) and Common Access Point (CAP) defined by OWA Framework. The Gateway acts as the network access router and is responsible for assigning IP addresses to access the backbone IP Core Network. Furthermore, it has the RTT (radio transmission technologies) specific user plane functions for the heterogeneous access networks as shown in FIG. 3, wherein the OWA LLC (link layer control) generates some common link layer functions for different RTTs. In addition to encryption and security implementations, the aforementioned OWA LLC can perform functionalities such as queuing of data packets, higher layer header compression, segmentation of IP packets and so on, which enables efficient and flexible access selection based on lossless reconfiguration of the link layer for the converged wireless and mobile network infrastructure.

The function of OWA-CD is to achieve an open service control and mobility management platform, to load or extend services and add new services flexibly, and to execute corresponding management in services and networks. CD can communicate with control plane in each CAP through control signals by IP core network, and has RTT bearer realization functionalities including cooperative open radio resource management (CORRM), RTT selection, spectrum sharing and load balance for different access systems based on OWA infrastructure. This network-centralized CORRM function can maximize the utilization of radio resources in terms of system performance and transmission performance.

CAP performs the base radio transceiver functionalities such as, but not limited to, E-Node B in 3G LTE (third generation long-term evolution), in which user plane and control plane split to provide services to Mobile Terminal (MT). CAP connects to the IP core network directly by access gateway and simplifies the complexity of the access network and decreases the time delay for traffic flow. CAP is capable to transform the data format between wireless and wired network and packet IP flows into wireless frames, and then transmits them onto different air interfaces based on OWA open air interface architecture. CAPs of different RTTs including GSM (global services for mobile communications), WLAN (wireless local area networks) and BWA (broadband wireless access), but not limited to, can connect with Gateway and cooperate with OWA-CD to furnish inter-system and intra-system control operations of the converged networks, such as radio resource management, mobility management, packet scheduling, QoS (quality of service) guarantee mechanism and so on, but not limited to.

To improve the network reliability and simplify the system implementation, the entity of OWA-CD can be a server connecting with IP core network, or can share the same entity with CAP in the access network.

For the OWA access network and protocol stack design, the corresponding MAC layer architecture of the CAP is very important because it not only guarantees the efficient packet transmission but also is responsible for the control scheme related to inter-system CORRM, RRM in local system and access control, etc. The invented OWA-CAP MAC layer architecture is disclosed in FIG. 4. The OWA cooperative manager supports CORRM functionality, which can cooperate with OWA-CD or act as the entity of OWA-CD to support RTT MAC, relay MAC for extended cell, as well as P2P (point-to-point) MAC for MT's direct communications, and provide proper strategy for other MAC entities to provide QoS for data flows and be consistent with the different network formats and modes for the OWA open air-interface MT.

Figure 4:
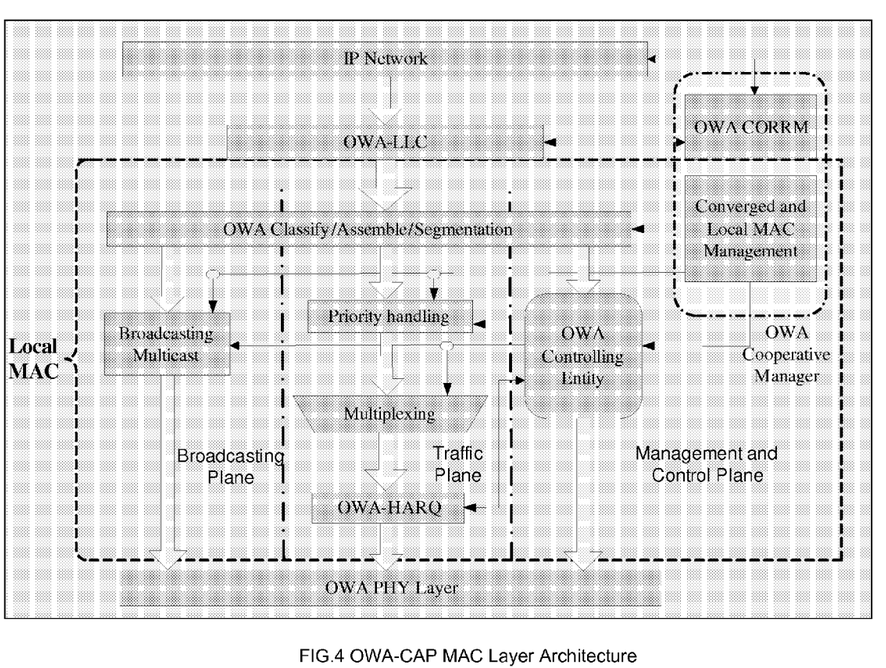
FIG. 4 details the OWA CAP medium access control (MAC) architecture comprising the multi-dimensional access control components for the converged and local radio resources.

For local CAP MAC implementation, the MAC layer comprises three planes: management and control plane, traffic plane, and broadcasting and multicast plane for the MBMS traffic. The OWA cooperative manager receives the upper layer controlling information and determines the MAC control signal processing strategy associated with CORRM, RRM in local and other control schemes.

The main OWA-CAP MAC components include:
1. OWA Controlling entity: receives the control signaling from the OWA framework, the upper layer and the OWA cooperative manager; controls the traffic transmission in user plane; communicates with other MAC components.
2. OWA Classify/Assemble/Segmentation: receives the packets from upper layer and classifies the packets according to OWA cooperative manager and controlling signaling; segments the large packet into proper MPDU (MAC Protocol Data Unit) size.
3. Priority handling: schedules the traffic packets queuing in the buffer; receives the control signaling from the OWA cooperative manager and OWA controlling entity.
4. Broadcasting and multicast: handles the system's broadcast and multicast information, and provides multicasting service for the converged wireless and mobile networks.
5. Multiplexing: provides proper multiplexing strategy to traffic and control packets.
6. OWA-HARQ: provides proper HARQ (Hybrid Automatic Repeat reQuest) scheme managed by the OWA cooperative manager and OWA controlling entity.

The broadcasting and multicast functional module is responsible for the process of broadcast and multicast service received by MTs which include a single on-going session (e.g. a multimedia stream) or may involve several intermittent multicast sessions over an extended period of time (e.g. messages). The QoS-guarantee scheme of this MBMS traffic is different from that of general traffics. The broadcasting and multicast module controls and sends MBMS traffic by common MBMS point-to-multipoint Control Channel (MCCH) and MBMS point-to-multipoint Traffic Channel (MTCH), which indicate which type of related logical channel is used for the MBMS, and identify data to a specific MBMS service.

The disclosed OWA MAC layer architecture separates the network control and the data transmission, and differentiates multi-user multi-broadcast service with unicast service, so it can reduce the complexity of traffic processing and improve the efficiency of MAC layer techniques in the integrated and converged access networks and traffics environment.

As an important MAC feature and a characteristic of 4G mobile communications with heterogeneous open access networks, access control scheme can support the efficient access control and packet transmission for multi-users and multi-traffics of the future service-oriented information delivery platform. The invented two-step access scheme includes inter-system network selection and intra-system access control in the selected network.

a. Inter-system Network Selection

In view of heterogeneous and open RTTs, the inter-system network selection considers many factors in terms of CORRM, QoS requirements of traffics and users' preference etc to provide the users of the "always best connected" services. Some network selection schemes for heterogeneous networks have been proposed, such as distributed network selection scheme, but it could not get the required network optimization and did not take into consideration the load unbalance problem in the whole heterogeneous systems. Another proposal incorporates a network selection algorithm combined with analytic hierarchy process (AHP) and grey relation analysis (GRA), which can effectively decide the optimum network through making trade-offs among network condition, user preference, and service application, while avoiding frequent handoffs, but the complexity is too high. The third proposal utilizes a low complexity, centralized network selection scheme aiming to optimally distribute the end users to the networks of the heterogeneous wireless system, but the algorithm did not consider the priorities of various traffics and will result in the loss of real-time traffics, for example, the VoIP (voice over IP). So we disclose the Converged Traffics RBR-based (CTR) algorithm to solve these problems, which is based on the measures of relative bandwidth request (RBR), to guarantee the QoS requirements of real-time traffics, maximize the global spectrum efficiency and reduce the computational complexity of the system implementation.

The CTR algorithm, as set forth above, is based on the following three mechanisms:

1. In general, users with real-time traffics have higher priorities which include VoIP, video stream, etc., and the users with non-real-time traffics such as best effort traffic etc have lower priorities;
2. The overall bandwidth occupation is most influenced by the user with the largest bandwidth request, so this user is allowed to select the network with the minimum bandwidth request for it to reduce the overall bandwidth occupation of heterogeneous networks;
3. The real-time traffic has lower bit rate requirement and higher priority compared with non-real-time data traffic, and that is to say, for the same bandwidth range it can accommodate more real-time users than non-real-time users.

b. Intra-system Multiple Access Control Scheme

The intra-system access control is based on the physical convergence layer and focus on how to decrease the end-to-end delay and improve the selected access network performance. There have been some studies on such intra-system access control protocol, but most of these MAC protocols were based on TDMA (time division multiplexing access) technique and allowed MTs to contend for uplink slot with Slotted-ALOHA, and did not take the access control measure to support the quick access and decrease the end-to-end delay, so their performance still can not meet the QoS requirements of traffics for the future converged mobile communications, and the traditional protocols or access schemes are not effective in OFDMA (orthogonal frequency division multiplexing access) system, which is one of the broadband high-speed air interfaces or RTTs for next generation wireless communications, and can not differentiate open air interface traffics in access control for the converged traffic environment. So the new access control protocol based on the OWA 4G mobile communications is to be developed in the present invention.

For the MAC protocols and access control techniques, there are two duplex schemes: frequency division duplex (FDD) and time division duplex (TDD). TDD is a very promising and attractive duplex mode for the rare frequency spectrum, and can utilize radio frequency more flexibly and effectively. Moreover, TDD is more appropriate for asymmetrical services so that radio resources can be allocated flexibly between uplink and downlink. Furthermore, TDD is also capable of increasing the service coverage with multiple transceiver antennas deployed in CAPs. Therefore, the new OWA MAC protocol and the disclosed intra-system adaptive access control scheme will be based on the TDD duplex mode supporting various air interfaces including OFDMA (Orthogonal Frequency Division Multiplexing Access), CDMA (Code Division Multiplexing Access) and TDMA (Time Division Multiplexing Access).

Figure 5:
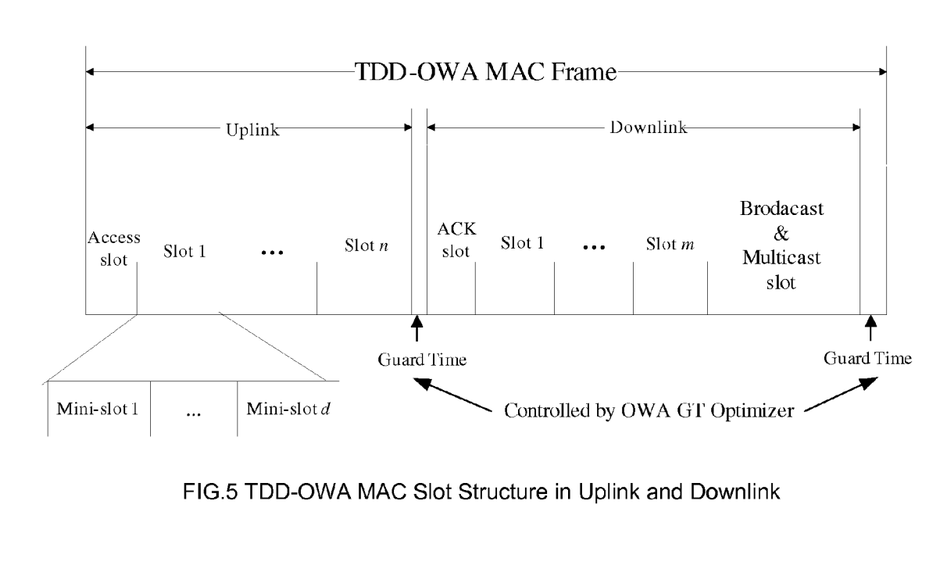
FIG. 5 illustrates the OWA MAC frame structure in the TDD (time division duplex) mode to enable the adaptive access control for the intra-system transmission optimization.

For the MAC frame structure used in TDD-OWA system shown in FIG. 5, the uplink slots comprise of one random access slot and n uplink transmission slots. In access slot, MTs can choose random access channel (RACH) in the frequency domain to send the access requests, and send data packets in uplink transmission slots. In order to allocate resources dynamically, the protocol further divides each regular slot into d mini-slots, which is defined as the basic transmission unit (BTU) in the time domain. In the case of OFDMA system, the mini-slot and the corresponding subband in frequency domain will be constructed as the mini-time-frequency block for flexible and dynamic resource allocation.

As shown in FIG. 5, the downlink slots comprise of one ACK (acknowledgment) slot, m downlink transmission slots and one broadcast/multicast slot used for broadcast and multicast traffics. CAP sends the ACK message for users' access request and the results of resource allocation, and sends the data packets in downlink transmission slots. For MBMS traffic, the access control message including, but not limited to, the initial probability factor and updated probability factor, can also be sent to MTs through MCCH in ACK slot, and the data is sent in broadcast/multicast slot. In addition, there is the guard time between uplink and downlink transmission. For TDD mode, the time slots allocation can be changed flexibly and openly in both uplink and downlink, so the resource allocation between the downlink transmission slots and broadcast/multicast slot can be re-allocated based on the system load and requirements of MBMS transmission. The open flexible allocation scheme improves the multimedia transmission performance to the end-user, while maintains the QoS of the subscribed voice and data services.

In order to utilize the radio resources and ensure quick access efficiently, a dynamic RACH assignment algorithm according to collision status on RACH is used in the disclosed access control scheme of the present invention.

The number of RACH can increase or decrease by detecting the temporary load of the uplink Access slot, then it is broadcasted to all MTs in the cell of the CAP. CAP computes the necessary number of RACH every K frames which is defined as record window.

As the system load gets much heavy and the number of MT access increases, the assigned number of RACH will increase. However the algorithm assures the finite increase of RACH in heavy load and guarantees at least one RACH per MAC frame to meet the need of random access in light load. The disclosed scheme allocates the RACH self-adaptively based on the access status of previous frames, so that the efficient resource utilization is ensured and the access delay is reduced.

Besides the dynamic RACH assignment scheme, a new solution to further reduce the access delay in heavy load is very important. Therefore a dynamic access probability algorithm is also introduced in the disclosed access control scheme of the present invention.

CAP will set an access probability threshold, saying $P_c$, for each user who wants to send access request according to available resources and load status currently. When the mobile terminal (MT) has packet to transmit, it chooses one RACH in the access slot to send its access request containing the traffic type information. The user must generate a permission probability $P_a$ randomly before sending its access request, and it will compare $P_a$ with $P_c$, which has been sent to all MTs in the system in downlink ACK slot. The user is allowed to send access request only when $P_a$ is more than $P_c$.

Therefore, the disclosed algorithm, as set forth above, takes the traffic priority into consideration, which can not only meet the requirement of access delay for real-time services, but also can take effective control to avoid congestion when the selected access network is operating in high load condition. The threshold of access permission probability $P_c$ will increase when the system is in heavy load, and accordingly, the access probability of low priority traffics will decrease dramatically. So the time delay of real-time traffics caused by excessively high collision probability of data user decreases greatly when the system is busy. Furthermore, the mechanism in which the CAP as a central manager taking measure for access control can show the advantage of centralized control scheme and simplify the complexity of the algorithm processed by each MT.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An Open Wireless Architecture (OWA) Converged Network Access Architecture system comprising:
   a) an OWA Gateway utilized as a network access router for assigning Internet Protocol (IP) addresses to access a backbone IP core network, and containing different radio transmission technology (RTT) user plane functions and Link Layer Control (LLC) functions for the heterogeneous open access networks, wherein the LLC manages common link layer functions for different OWA CAPs including encryption, security control, queuing of data packets, higher layer header compression, segmentation of IP packets to enable efficient and flexible access selection based on lossless reconfiguration of the link layer for converged multiple access networks,
   b) an OWA Common Access Point (CAP) providing common radio transceiver functionalities with an OWA Mobile Terminal (MT) through the user plane and a control plane independently, and connecting with an IP core network directly by said OWA Gateway to simplify the complexity of access networks and decrease the access time delay by minimizing the number of access nodes for the traffic flow; the OWA CAP transforming the data format between wireless and wired networks and packetting IP flows into wireless frames before transmitting the frames onto different air interfaces and vice verse, wherein said OWA CAP is based on open wireless architecture (OWA) platform which is extensible, variable, upgradeable and removable to support multiple air interfaces of converged network access infrastructure, said OWA CAP further comprising: a LSB (Low Spectrum Band) CAP for wide range coverage and supporting seamless full mobility of said OWA MT with spectrum below or not above a preset frequency reference point of 3GHz, but can be changed by an OWA Control Domain (CD), and an HSB (High Spectrum Band) CAP for hotspot coverage and supporting low mobility of said OWA MT with spectrum above said preset frequency reference point, wherein said HSB CAP can share the same entity with said LSB CAP or be an independent entity based on a commercial network optimization model; and a Relay node which can be utilized to expand the service coverage for said LSB CAP and said HSB CAP; wherein said OWA CAP utilizes most access control processing of an OWA inter-system network selection and an adaptive access control scheme to simplify the complexity of algorithms processed by each said OWA MT and improve the system performance of converged network access architecture; wherein said LSB CAP is utilized to provide seamless full mobility and wide area cellular wireless networks as well as local area wireless access networks while said HSB CAP is utilized to provide very high-speed, broadband wireless access systems with limited mobility to maximize radio spectrum utilization efficiency based on OWA convergence infrastructure,
   c) an OWA Control Domain (CD) enabling an open service control and mobility management platform to load or extend services and add new services flexibly, and to execute corresponding management in the converged services and networks, and support the control plane in said OWA CAP with control signals through IP core networks and with said RTT bearer functionalities including cooperative open radio resource management (CORRM), RTT selection, spectrum sharing and local balance for different access systems of open wireless architecture (OWA) convergence infrastructure, wherein said OWA CD can be a server connecting with said IP core network, or the OWA CD can share the same entity with said OWA CAP to improve network reliability and simplify the system implementation,
   d) an OWA Mobile Terminal (MT) supporting open air interfaces of different RTTs based on an OWA convergence framework wherein the OWA MT is based on open wireless architecture (OWA) platform which is extensible, variable, upgradeable and removable to support multiple air interfaces of converged network access infrastructure, and
   e) an OWA platform converging different RTTs in said OWA MT and said OWA CAP systems by mapping various RTTs into open interface parameters defined by OWA basic input/output system (BIOS) and Framework architecture, wherein said OWA Gateway, said OWA CAP and said OWA MT construct the cost-effective and spectrum-efficient OWA converged access networks by minimizing the number of network access nodes and the transmission delay to optimize the network access performance.

2. A Converged Medium Access Control (MAC) Architecture for OWA CAP (open wireless architecture common access point), system comprising:
   a) an OWA Cooperative Manager supporting (cooperative open radio resource management (CORRM) functionalities by cooperating with an OWA control domain (CD) or acting as the function of said OWA-CD to support local radio transmission technology (RTT) medium access control (MAC), relay MAC or converged MAC as well as point-to-point (P2P) MAC for an OWA mobile terminal (MT)'s direct communications, and provide proper strategy for other MAC entities with required quality of service (QoS) for data flows in consistent with different network formats and modes for said OWA MT of open air interfaces, and managing converged access control schemes including OWA inter-system network selection and intra-system access control within a selected access network, wherein said OWA inter-system network selection is based on the measurement of relative bandwidth request of said OWA MT which comprises: users with real-time traffics such as Voice-over-IP (Internet Protocol), video stream having higher priorities, and users with non-real-time traffics such as best effort services having lower priority, overall bandwidth utilization being most influenced by an user with the largest bandwidth request, so this user allowed to select a network with the minimum bandwidth request to reduce the overall bandwidth utilization of converged networks, and the Real-time traffic having lower bit rate requirement and higher priority network access compared with the non-real-time data traffic so that the same bandwidth is capable of accommodating more real-time users than non-real-time users,
b) an OWA Controlling Entity receiving a control signaling from an OWA framework, an upper layer and said OWA CORRM to control the traffic transmission in user plane and communicate with other MAC modules,
c) an OWA Classify/Assemble/Segmentation Entity receiving packets from upper layer and classifying packets according to said OWA cooperative manager and controlling signaling as well as segmenting large packets into proper MAC protocol data unit size,
d) an OWA Priority handling module scheduling traffic packets queuing in a buffer and receiving control signaling from said OWA cooperative manager and said OWA controlling entity,
e) an OWA Broadcasting and Multicasting module handling the system's broadcast and multicast information management, and providing multicasting service for converged wireless and mobile access networks, wherein said OWA broadcasting and multicasting module is responsible for the process of Multimedia Broadcast and Multicast Services (MBMS) data to be sent to OWA MTs which include a single on-going session including multimedia stream or several intermittent multicast sessions over an extended period of time including multimedia messages,
f) an OWA Multiplexing module providing proper multiplexing schemes to traffic and control packets, wherein said OWA broadcasting and multicasting module also controls and sends MBMS traffic by a common MBMS point-to-multipoint Control Channel (MCCH) and MBMS point-to-multipoint Traffic Channel (MTCH) which indicate what type of related logical channel is used for MBMS, and identify data to a specific said MBMS service,
g) an OWA HARQ module providing proper Hybrid Automatic Repeat reQuest (HARQ) scheme managed by said OWA cooperative manager and said OWA controlling entity, and
h) an OWA platform converging different RTTs in said OWA MT and said OWA CAP systems by mapping various said RTTs into open interface parameters defined by OWA basic input/output system (BIOS) and Framework architecture, wherein local RTT MAC further comprises OWA-based a management and control plane, a traffic plane, and a broadcast and multicast plane for Multimedia Broadcast and Multicast Service (MBMS) traffic, wherein said OWA-based management and control plane, said traffic plane and said broadcast and multicast plane separate access network control with data transmission, and differentiate multicast and broadcast services with unicast service in order to reduce the complexity of traffic processing and improve the efficiency of access control and spectrum utilization in a converged access networks and services environment.

3. An Open wireless architecture time division duplex (OWA TDD) method for Converged Medium Access Control (MAC) Frame Structure comprising:
a) choosing a random access channel (RACH) to send access requests for an intra-system adaptive access control scheme using an Uplink Access Slot utilized for an open wireless architecture mobile terminal (OWA MT),
b) utilizing Uplink Transmission Slots of said OWA MT to send data packets, and further divide said Uplink Transmission Slots into several uplink mini-slots as a group of basic transmission units (BTU) within each Uplink transmission slot in order to support dynamic resource allocation, wherein said uplink mini-slot and its corresponding sub-band of frequency domain are constructed as a mini-time-frequency block for dynamic resource allocation in a orthogonal frequency division multiplexing access (TDD OFMDA) system,
c) utilizing Downlink Acknowledgment (ACK) Slots of an OWA (open wireless architecture(OWA) common access point (CAP) to send an ACK message for said OWA MT's access request and the results of resource allocation, as well as a Multimedia broadcast and multicast service Control Channel (MCCH) message for Multimedia Broadcast and Multicast Service (MBMS) traffic,
d) utilizing Downlink Transmission Slots of said OWA CAP to send data traffic packets to said OWA MT,
e) utilizing Downlink Broadcast and Multicast Slot utilized of OWA CAP to send said MBMS traffic,
f) utilizing Guard Time between said Uplink and said Downlink transmission, and
g) managing location and length of said TDD transmitting utilizing an OWA Guard Time Optimizer and receiving switch point critical for TDD transmission for cooperative open radio resource management(CORRM), MAC, transmission convergence and spectrum utilization,
wherein resource allocation between said downlink transmission slots and said downlink broadcast and multicast slot can be re-allocated based on system load and requirements of MBMS traffic to improve multimedia transmission performance to end users while maintaining quality of service (QoS) of subscribed voice and data services, wherein said method further includes an adaptive access control scheme which comprises:
h) increasing or decreasing the number of RACH by detecting temporary load of said uplink access slot before being broadcasted to all said OWA MTs in a cell of said OWA CAP,
i) increasing the assigned number of RACH as the loading of the OWA CAP gets heavy as the number of OWA MTs increases,
j) Controlling finite increase of said RACH in heavy load and guaranteeing at least one RACH per MAC frame to meet the need of random access in light load,
k) Allocating said RACH self-adaptively based on access status of previous said MAC frames,
l) Setting an access probability threshold Pc in said OWA CAP for each said OWA MT that wants to send access request according to available resources and current load status,
m) Choosing one RACH in an uplink access slot to send its access request containing traffic type information when said OWA MT has packet to transmit,
n) Generating a permission probability Pa randomly before said OWA MT sending its access request, comparing said Pa with said Pc which has been sent to all said OWA MTs through said downlink ACK slot, and allowing said OWA MT to send access request only when said Pa is more than said Pc, and
o) increasing Pc when access system is in heavy load, and accordingly, decreasing the access probability of low priority traffics so that the time delay of real-time traffics caused by excessively high collision probability of data user decreases greatly when access system is busy.

* * * * *